(12) United States Patent
Wittliff, III (10) Patent No.: US 10,181,227 B2
(45) Date of Patent: Jan. 15, 2019

(54) SELF SERVICE VEHICLE DIAGNOSTICS

(71) Applicant: Bosch Automotive Service Solutions Inc., Warren, MI (US)

(72) Inventor: William W. Wittliff, III, Gobles, MI (US)

(73) Assignee: Bosch Automotive Service Solutions Inc., Warren, MI (US)

( * ) Notice: Subject to any disclaimer, the term of this patent is extended or adjusted under 35 U.S.C. 154(b) by 401 days.

(21) Appl. No.: 14/985,693

(22) Filed: Dec. 31, 2015

(65) Prior Publication Data

US 2017/0193716 A1    Jul. 6, 2017

(51) Int. Cl.
G07C 5/02      (2006.01)
G07C 5/08      (2006.01)
B60L 11/00     (2006.01)
B60L 11/18     (2006.01)
G06Q 20/18     (2012.01)
G06Q 50/06     (2012.01)

(52) U.S. Cl.
CPC ............ G07C 5/0841 (2013.01); B60L 11/00 (2013.01); B60L 11/1816 (2013.01); B60L 11/1861 (2013.01); G06Q 20/18 (2013.01); G06Q 50/06 (2013.01); G07C 5/02 (2013.01)

(58) Field of Classification Search
CPC ............... G01C 5/0841; B60L 11/1816; B60L 11/1861; G06Q 20/18; G06Q 50/06; G07C 5/02; G07F 17/0014
See application file for complete search history.

(56) References Cited

U.S. PATENT DOCUMENTS

| | | | |
|---|---|---|---|
| 2006/0142910 A1* | 6/2006 | Grier | G06Q 10/06 701/31.4 |
| 2010/0204876 A1* | 8/2010 | Comeau | G07C 5/008 701/29.6 |
| 2011/0029144 A1* | 2/2011 | Muller | B60L 11/1816 700/293 |
| 2013/0158777 A1* | 6/2013 | Brauer | G06Q 10/20 701/31.4 |

FOREIGN PATENT DOCUMENTS

EP    3139352 A1 *  3/2017  ............. G06Q 20/18

* cited by examiner

Primary Examiner — Aaron L Troost
(74) Attorney, Agent, or Firm — Baker & Hostetler LLP (57) ABSTRACT

A power providing station with integrated diagnostic functions is provided that includes the ability to charge or fuel a vehicle and perform various diagnostic functions. The various diagnostic functions such as tread depth measurement, battery testing, measuring tire pressures, performing safety inspection, emissions testing and performing vehicle diagnostics and the like may be performed while the vehicle is at the power providing station. The results of the diagnostic tests may be provided to the driver at the end of the charging or fueling via a wireless computing device.

20 Claims, 5 Drawing Sheets

SELF SERVICE VEHICLE DIAGNOSTICS

FIELD OF THE INVENTION

The present invention relates generally to self-service vehicle diagnostics. More particularly, the present invention relates to a gas station and/or an electric vehicle charging station having integrated self-service vehicle diagnostics.

BACKGROUND OF THE INVENTION

Vehicles such as automobiles may be gas powered, electric powered or a combination thereof (hybrid). After driving the vehicle for certain amount of time, the driver must fill up a gas powered vehicle with gasoline and/or charge the electric or hybrid vehicle. While filling or charging the vehicle, there is downtime for the vehicle and the driver. The downtime may range from five minutes to hours depending if the driver is filling the vehicle with gas or charging the vehicle (typically takes longer).

Maintenance of a vehicle is important to avoid costly repairs. For example, maintaining proper alignment of the tires will prevent the tires from wearing unevenly leading to early and costly replacement of the tires. However, vehicle owners typically will not bring a vehicle in for maintenance unless it's scheduled or that there is something wrong with the vehicle. For example, if the vehicle pulls to the right while being driven, then this will prompt the owner to bring in the vehicle for an alignment.

Accordingly, it is desirable to provide self-service vehicle diagnostic systems to take advantage of the down time at the gas or charging station.

SUMMARY OF THE INVENTION

The foregoing needs are met, to a great extent, by the present invention, wherein in one aspect of a system is provided that in some embodiments include a power providing station such as a gas station or an electric vehicle charging station (EVCS) that includes self-service vehicle diagnostics.

A station for providing power to a vehicle is provided and may include, a power providing station that provides power to the vehicle via a connector, the power providing station may be configured to lock a wireless diagnostic tool or a wireless battery tester in place until released and may include a mobile payment sensor, a diagnostic bay may be configured to perform various diagnostic functions including tire depth measurement and retrieving a set diagnostic trouble code from a vehicle's electronic control unit, and a control system that may be configured to receive a payment for the various diagnostic functions and power, the control system may be further configured to receive the tire depth measurement and the set diagnostic trouble code, wherein the control system diagnoses the connected vehicle based on the received tire depth measurement and the set diagnostic trouble code, and wherein the diagnosis is sent to a driver's wireless computing device.

In another embodiment, an electric charging station for providing electric power to a vehicle is provided and may include a connector that may be configured to be received in the vehicle's charging receptacle to provide electric power, a mobile payment sensor that may be configured to receive a payment via a wireless computing device, a wireless diagnostic tool that may be configured to be locked in place with the electric charging station until released, a diagnostic bay that may be configured to perform various diagnostic functions including tire depth measurement and retrieving any set diagnostic trouble code from a vehicle's electronic control unit, and a control system that may be configured to receive the payment sensed by the mobile payment sensor for the various diagnostic functions and electric power, the control system further configured to receive the tire depth measurement and the set diagnostic trouble code, wherein the control system diagnoses the connected vehicle based on the received tire depth measurement and the set diagnostic trouble code, and wherein the diagnosis is sent to the wireless computing device.

There has thus been outlined, rather broadly, certain embodiments of the invention in order that the detailed description thereof herein may be better understood, and in order for the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

The invention will now be described with reference to the drawing figures, in which like reference numerals refer to like parts throughout. An embodiment in accordance with the present invention provides a power providing station that is capable of performing self-service vehicle diagnostics while the vehicle is at the power providing station. In some embodiments, before, during or after filling (gas) or charging (electric) the vehicle, vehicle diagnostics such as tire pressure monitoring, battery testing, wheel alignment, other vehicle diagnostic including retrieving any set diagnostic trouble codes, and safety and emissions testing and the like may be performed. By performing these services at a power providing station, vehicle diagnostic will be performed more often than simply when the driver has an issue with the vehicle. Thus, potential damaging issues may be avoided if the issues with the vehicle are detected earlier. In other embodiments, power providing station may be located at a vehicle service center such as a Toyota or General Motors dealer so that any needed service may be performed on-site.

Figure 1:
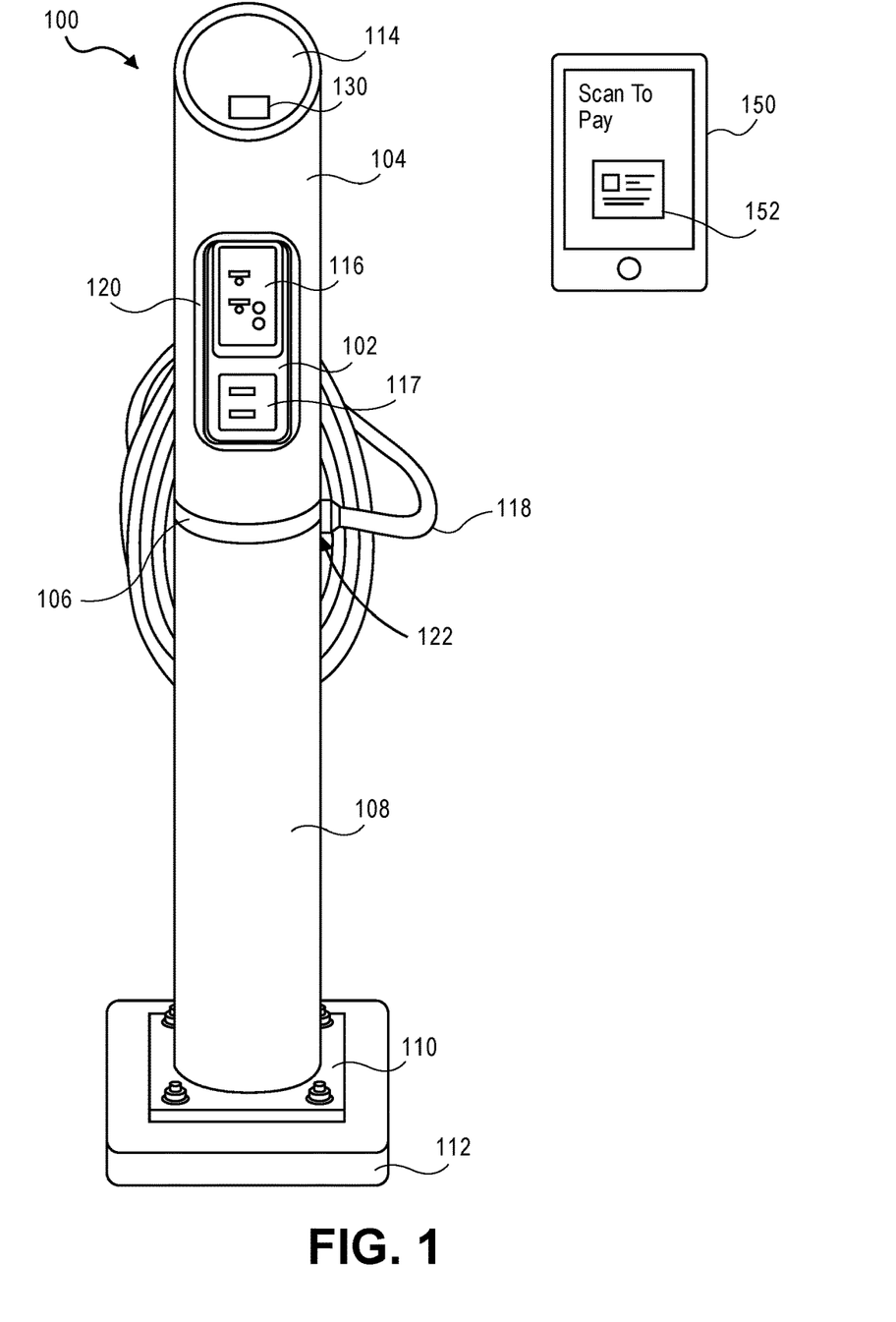
FIG. 1 illustrates an exemplary electric vehicle charging station according to an embodiment of the invention.

FIG. 1 illustrates an exemplary electric vehicle charging station 100 according to an embodiment of the invention. The electric vehicle charging station (EVCS) 100 can be any type of charging station that is capable of charging any type of electric vehicles and/or hybrid vehicles with various different levels (120V level I or 240 V level II) of charging for a predetermined amount of time. The EVCS 100 may be utilized in a power providing station 400 (FIG. 4) in order to charge a vehicle.

The EVCS 100 may include includes an upper housing 104 and a lower housing 108 constructed according to, for example, NEMA 4× standards. In between the upper housing 104 and the lower housing 108 may be a seal 106. The seal 106 may help ensure that water and other environmental elements are less likely to enter the EVCS 100. Additionally, the seal 106 ensures that the upper housing 104 and the lower housing 108 may align and connect with one another and form a uniform construction. The EVCS 100 also includes an attachment structure 110 that may include a plate having a plurality of apertures therein for connection to mechanical fasteners. In this regard, the mechanical fasteners may be arranged in an anchor 112 in order to fix the EVCS 100 in place.

The EVCS 100 includes the charging cable 118, which connects to the EVCS 100 at connection 122 at one end and to the vehicle's charging receptacle at the other end. The charging cable 118 can be any length as desired in order to reach the vehicle's charging receptacle regardless of where it is located on the vehicle.

A touchscreen display 114 includes a sensor 130 in order to receive various forms of payments including mobile phone payments, credit cards with smart chips, and the like. The driver can interact with the touchscreen display 114 to control the various functions of the EVCS including the level charging and the amount of charging time desired for his vehicle. The sensor may be any type of sensor or a combination of sensors such as infrared, near field communication (NFC), Bluetooth, barcode reader, chip, and any other type of sensors that is utilized in mobile payments such as Apple Pay™, Google Pay™, PayPal™ and the like. Thus, the driver may use his wireless computing device 150 such as a smart phone, smart watch, smart glasses, game consoles, and the like that can display a barcode 152 or uses NFC and the like in order to make a mobile payment.

A portable wireless vehicle diagnostic tool 116 and/or wireless battery tester 117 may be received in tool holder 120 having a wall 102 to couple with the portable wireless vehicle diagnostic tool and the wireless battery tester. The wireless vehicle diagnostic tool 116 may be the U-Scan™ and wireless battery tester 117 may the Smart Battery Tester™ both from Bosch Automotive Service Solutions Inc., located in Warren Mich. Both the wireless vehicle diagnostic tool 116 and the wireless battery tester 117 are held or locked in place until released from the tool holder 120. Any type of locking mechanism can be utilized such as a tab lock system, a casing system, a magnetic system and the like. In one embodiment, the wireless vehicle diagnostic tool 116 and the wireless battery tester 117 are held in place by super magnets known in the art (one magnet on the back of the tool and the complimentary magnet on the wall 102 or the wall 102 is a super magnet. Upon receiving a form of payment to charge the vehicle, the super magnets can be released from each other so that the wireless vehicle diagnostic tool 116 can be plugged in to a datalink connector in the vehicle in order for the tool to retrieve any set diagnostic trouble code (DTC) and/or perform vehicle diagnostics. Additionally, the ends (positive and negative) wireless battery tester 117 may be connected to a vehicle's battery in order to conduct a battery test. In another embodiment, upon receiving a form of payment, EVCS may also electronically unlock the locked screen on the wireless vehicle diagnostic tool 116 or tester 117 or enable the tool and tester to function properly.

By releasing the wireless vehicle diagnostic tool 116 and the wireless battery tester 117 when a payment is received, the owner of the EVCS can also charge a second payment the driver for the tool or tester in the event that either or both of the wireless vehicle diagnostic tool 116 and the wireless battery tester 117 are not returned to the EVCS 100 after charging or after a predetermined period of time such as 30 minutes, 60 minutes, one day, one week, one month and the like. Once the charging of the vehicle is completed, the wireless vehicle diagnostic tool 116 and the wireless battery tester 117 may be returned and the super magnets may be recharged in order to hold the tool and tester in the locked position.

Figure 2:
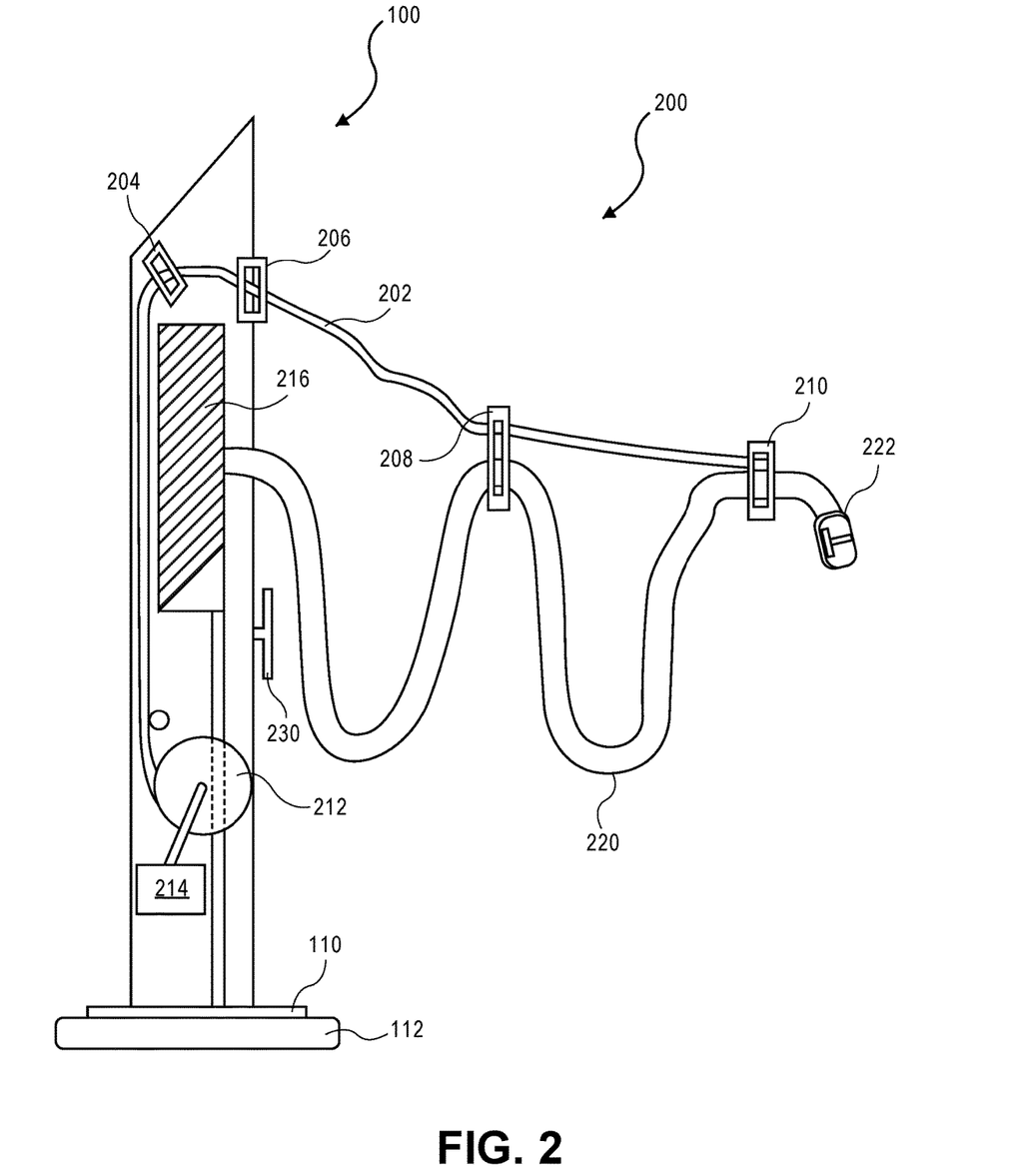
FIG. 2 illustrates shows arrangement for housing a diagnostic cable having a cable management system in accordance with an aspect of the invention.

FIG. 2 illustrates shows arrangement for housing a diagnostic cable having a cable management system in accordance with an aspect of the invention. In particular, FIG. 2 shows an aspect of the EVCS 100 that includes a vehicle diagnostic cable management system 200 for a vehicle diagnostic cable 220. The vehicle diagnostic cable 220 is configured to mate with the datalink connector in the vehicle in order to retrieve diagnostic information including set DTCs similar to the wireless vehicle diagnostic tool 116. The vehicle diagnostic cable 220 is configured to have a connector 222 at an end to connect to the vehicle's datalink connector. In other aspects of the invention, the vehicle diagnostic cable 220 may be looped and secured on a hook 230 when not in use. The vehicle diagnostic cable management system 200 includes a support line 202 to help manage the vehicle diagnostic cable 220. In this regard, the support line 202 may hold one or more portions of the vehicle diagnostic cable 220 to keep the cable 220 off the ground, and guide it back to the EVCS 100, or the like.

The support line 202 may be fixed to the top of the EVCS 100, and may be configured to move with respect to EVCS 100 or the support line 202 may be configured to move into the EVCS 100. If the support line 202 is fixed to the top of EVCS 100, then the support line 202 may be configured as an elastic cord or the like. Such an arrangement may allow a user to stretch the support line 202 and move the vehicle diagnostic cable 220 to the vehicle's datalink connector, as desired. The datalink connector provides a connection to the vehicle's electronic control units (ECUs) that store diagnostic information. Once the vehicle diagnostic is completed, the vehicle diagnostic cable 220 may be easily guided to the EVCS 100 by the elastic nature of the support line 202.

In another aspect of the invention, the EVCS 100 may include a mechanism to move the support line 202 with respect to the EVCS 100. The vehicle diagnostic cable management system 200 may include for example, a roll system 212 to gather and maintain the support line 202 within the EVCS 100. The roll system 212 may be actuated by an actuator 214, such as a spring, electric motor, or the like. In this regard, pulling the vehicle diagnostic cable 220 away from EVCS 100 may also extend the support line 202 from the EVCS 100 and the roll system 212 as well. During this action, the support line 202 may be unrolled from the roll system 212. When use of the vehicle diagnostic cable 220 is finished, the roll system 212 may urge the support line 202 to roll onto the roll system 212 via the actuator 214 and allow the vehicle diagnostic cable 220 to be held in holder 216 in the EVCS 100. Additionally the EVCS 100 may include one or more pulleys or grommets 204, 206, 208, 210 to guide the support line 202 towards the roll system 212.

Figure 3:
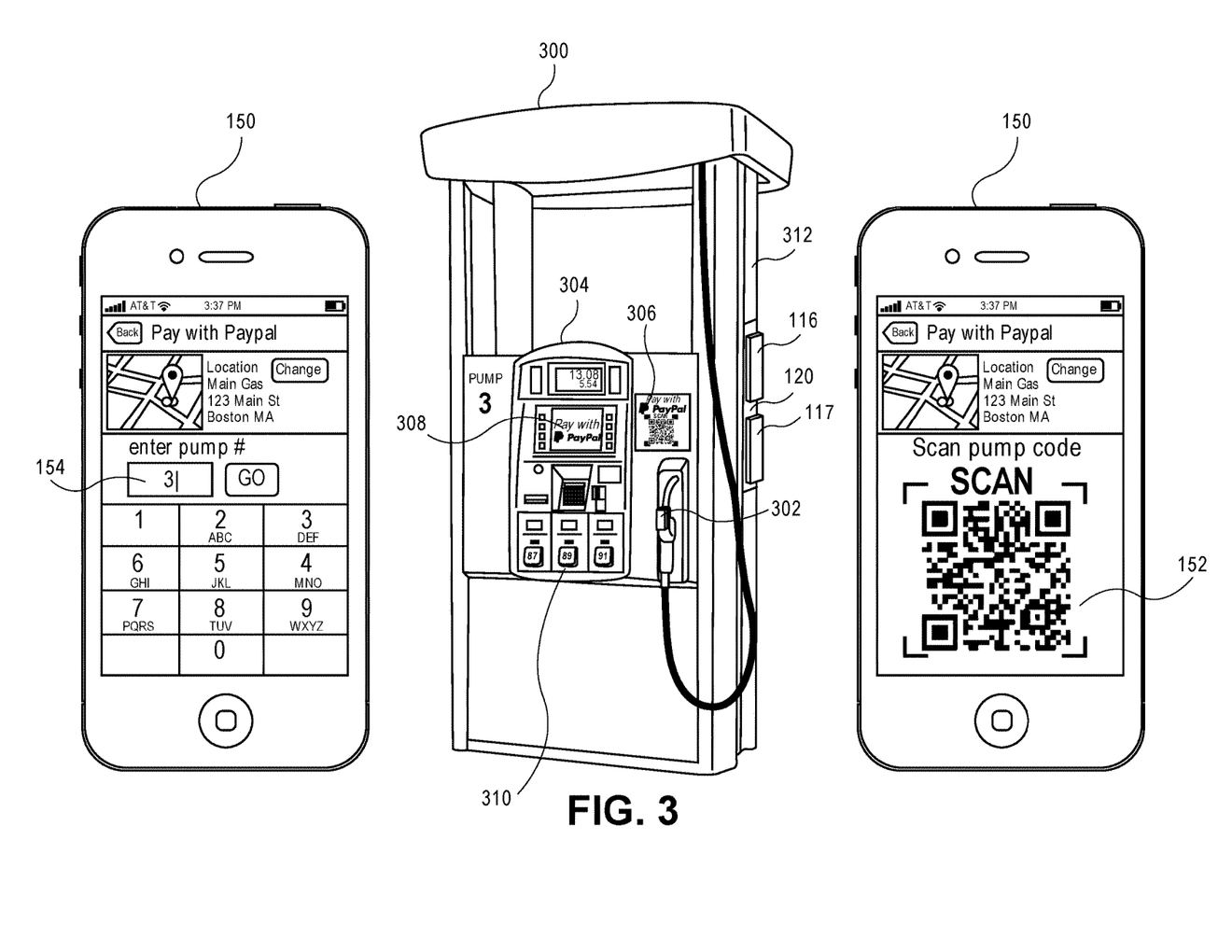
FIG. 3 illustrates a gas pump according to an embodiment of the invention.
Figure 4:
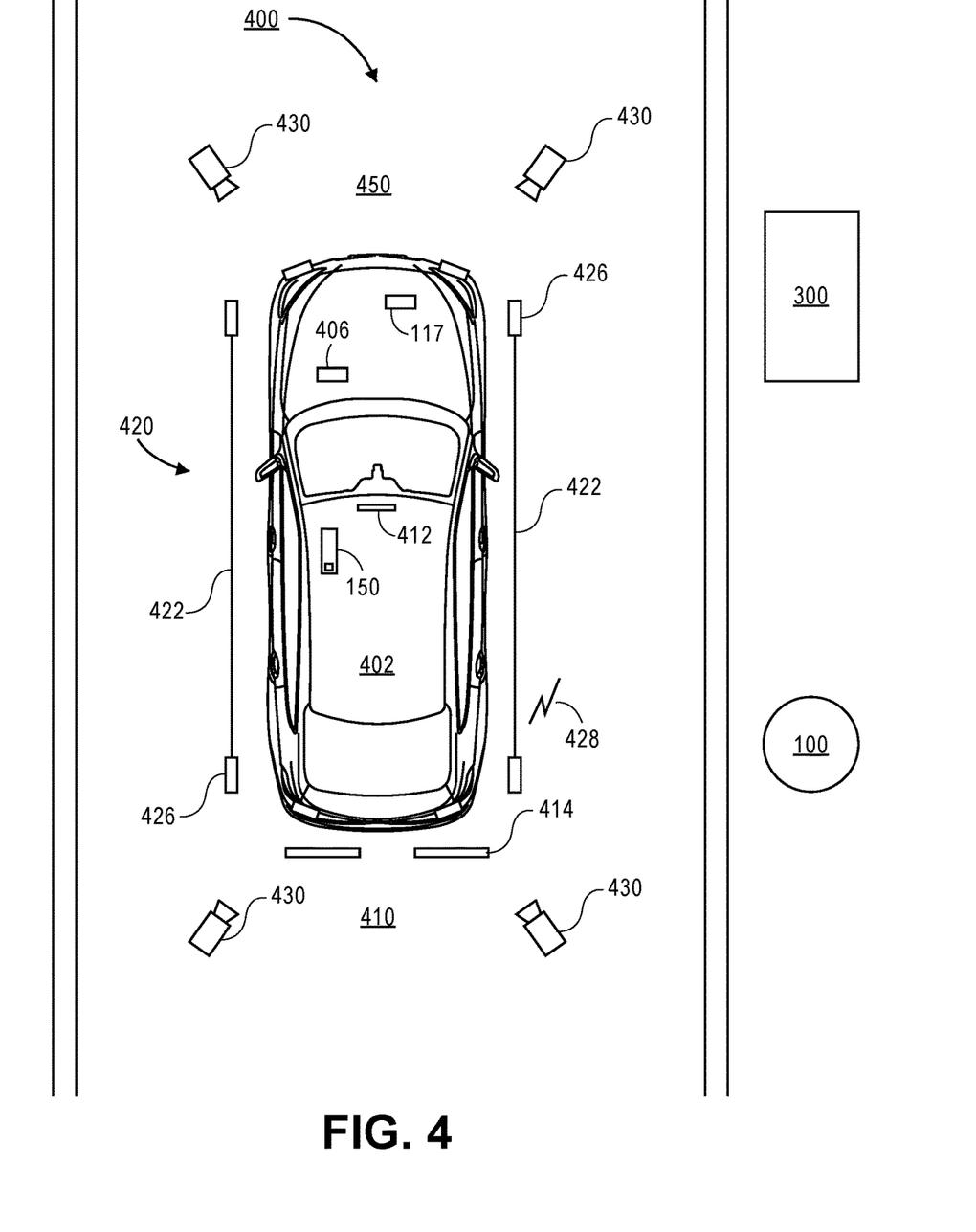
FIG. 4 illustrates a vehicle located within a power providing station having various self-diagnostic capabilities according to an embodiment of the invention.

FIG. 3 illustrates a gas pump 300 according to an embodiment of the invention. The gas pump 300 may be utilized as part of the power providing station 400. The gas pump 300 includes a fuel dispenser 302, user interface 304, mobile payment sensor 306, a display 308 and fuel grade selectors 310. The gas pump may be any pump that delivers gasoline or fuel at different grades to the gas powered or hybrid vehicle. Any type of fuel may be dispersed at the gas pump 300 including unleaded gasoline, blended gasoline, biofuels, diesel and the like. The fuel dispenser 302 is configured to be received in a fuel tank of the vehicle 402 (FIG. 4). The user interface 304 can include a touchscreen display 308 that may be used by the driver to interact with the gas pump 300 to select form of payment, to print receipts or carwash codes, to set an amount of fuel to disperse based on volume (gallons, litters, and the like) and/or an amount of value and the like.

Similar to the EVCS 100, the gas pump 300 may take various forms of mobile payments such as Apple Pay™, Google Pay™, PayPal™ or payments via credit cards and the like. Payments may be received via mobile payment sensor 306, which may be any type of sensor or a combination of sensors such as infrared, near field communication (NFC), Bluetooth, barcode reader, chip, and any other type of sensors that is utilized in mobile payments such as Apple Pay™, Google Pay™, PayPal™ and the like. The driver may use his wireless computing device 150 such as a smart phone, smart watch, smart glasses, game consoles, and the like that can display a barcode 152 or uses NFC and the like in order to make a mobile payment. In another embodiment, the driver may use an app 154 on the wireless computing device 150 that communicates wirelessly to the mobile payment sensor 306 or sensor 130 (EVCS) in order to make a payment.

The portable wireless vehicle diagnostic tool 116 and/or wireless battery tester 117 may be received in tool holder 120 having a wall 312 to couple with the portable wireless vehicle diagnostic tool and the wireless battery tester. The wireless vehicle diagnostic tool 116 may be the U-Scan™ and wireless battery tester 117 may the Smart Battery Tester™ both from Bosch Automotive Service Solutions Inc., located in Warren Mich. Like the embodiments of the EVCS 100, both the vehicle diagnostic tool 116 and the wireless battery tester 117 are held or locked in place until released from the tool holder 120. Any type of locking mechanism can be utilized such as a tab lock system, a casing system, a magnetic system and the like. In one embodiment, the vehicle diagnostic tool 116 and the wireless battery tester 117 are held in place by super magnets known in the art (one magnet on the back of the tool and the complimentary magnet on the wall 312 or the wall 312 is a super magnet. Upon receiving a form of payment to charge the vehicle, the super magnets can be released from each other so that the vehicle diagnostic tool 116 can be plugged into the datalink connector in the vehicle in order for the tool to retrieve any set diagnostic trouble code (DTC) and/or perform vehicle diagnostics. Additionally, the ends (positive and negative) of the wireless battery tester 117 may be connected to a vehicle's battery in order to conduct a battery test. In another embodiment, upon receiving a form of payment, EVCS may also electronically unlock the locked screen on the tool 116 or tester 117 or enable the tool and tester to function properly.

By releasing the vehicle diagnostic tool 116 and the wireless battery tester 117 when a payment is received, the owner of the gas pump 300 can also charge a second payment to the driver for the tool and tester in the event that either or both of the vehicle diagnostic tool 116 and the wireless battery tester 117 are not returned to the gas pump 300 after fueling or after a predetermined period of time, such as 30 mins, 60 minutes, one day, one week and the like. Thus, once the fueling of the vehicle is completed, the vehicle diagnostic tool 116 and the wireless battery tester 117 may be returned and the super magnets may be recharged in order to hold the tool and tester in the locked position.

FIG. 4 illustrates a vehicle 402 located within a power providing station 400 having various self-diagnostic capabilities according to an embodiment of the invention. The power providing station 400 may include the EVCS 100 and/or the gas pump 300 and a diagnostic bay 450. The EVCS and the gas pump may be separated or may be housed as one device. The vehicle 402 may be a connected vehicle that includes a wireless computer system 406 that may communicate with the ECUs of the connected vehicle to provide the EVCS 100 and/or the gas pump 300 with diagnostic information including set DTCs. The wireless computer system 406 may communicate via a wireless connection to an external computing device, such as EVCS 100 or the gas pump 300. The wireless connection may communicate via RF (radio frequency), satellites, cellular phones (analog or digital), Bluetooth®, Wi-Fi, Infrared, ZigBee, Local Area Network (LAN), WLAN (Wireless Local Area Network), Wide Area Network (WAN), NFC (near field communication), other wireless communication configurations and standards, or a combination thereof. In another embodiment, the wireless computer system 406 allows the EVCS 100 and/or the gas pump 300 to communicate directly with the ECUs. Information including the results of diagnostic tests that are performed at the diagnostic bay 450 may be displayed on display 412 (vehicle entertainment system) of the vehicle or on the wireless computing device 150.

In an alternative embodiment, if the connected vehicle 402 does not have any means to retrieve and transmit diagnostic trouble codes and diagnostic information or perform battery tests, the portable wireless vehicle diagnostic tool 116 and/or wireless battery tester 117 may be utilized as discussed herein.

The diagnostic bay 450 may allow the driver to conduct various diagnostic tests including tread depth measurement, measuring tire pressures, battery tests, performing safety inspection, emissions testing and performing vehicle diagnostics and the like while the connected vehicle is fueling or charging. In one embodiment, the diagnostic bay 450 may be located a different location of the power providing station 400 than near an EVCS 100 or the gas pump 300.

The diagnostic bay 450 may include a tire tread determination system 410, in which a tire tread may be determined based on various techniques such as light, imaging, sound, gauge and the like. The tire tread determination system 410 includes at least one tire sensor 414, but may include 2 (as shown) or more tire sensor 414. In one embodiment, there is one tire sensor 414 configured and positioned to receive each tire of the connected vehicle 402.

Figure 5:
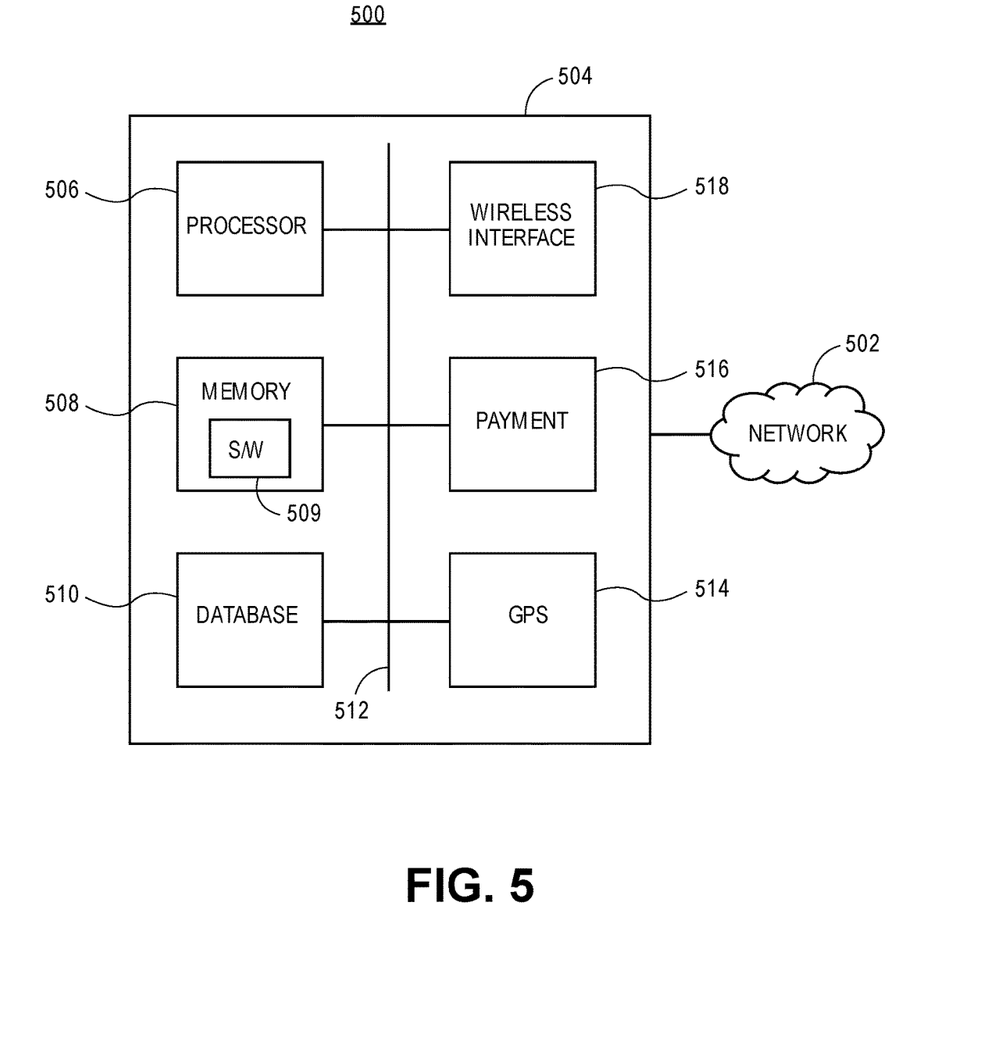
FIG. 5 illustrates a control system that may be used with the EVCS or the gas pump according to an embodiment of the invention

The tire tread determination system 410 is configured to measure a tread depth of a tire in order to determine whether the tire needs to be replaced. The connected vehicle's 402 information, such as a VIN number or tire identifying information can be entered into the display 114 of the EVCS 100 or the user interface 304 of the gas pump 300 so that the proper tread depth information can be loaded onto the control system 500 (further discussed below). Once the VIN or other vehicle/tire identification information is entered, the control system 500 can load up a starting depth of a new tire to measure against the tire of the connected vehicle. Instructions to the driver, if needed, may be displayed on a display 412 (and/or voice) of sound system on the connected vehicle or on the wireless computing device 150. Depending on the tire tread determination system 410 used, an energy signal such as sound, light and the like is emitted and returned to a sensor to measure the various depths of the tires. Once the measured depths information is gathered and compared against the starting depth of a similar (i.e. brand, make, size) new tire, then the control system 500 can let the driver know whether the tire or tires need to be replaced and approximately how soon. Further, the measured tread depths information may also indicate that an alignment is needed or that the shocks need to be replaced.

In one embodiment, a diagnostic report for all of the diagnostic tests may be generated at the end of the fueling or charging of the vehicle by being printed and/or sent to the driver's wireless computing device 150. If the driver provides contact information, such as cell number, or email address to the EVCS or the gas pump or if a mobile pay service (e.g. PayPal™, Apple Pay™, Google Pay™) on the wireless computing device 150 is utilized then contact information of the wireless computing device such as mobile identification number, mobile subscription identification number, or unique device identifier and the like may also be provided to the control system 500 in order to receive the report on the wireless computing device 150. Thus, if a tire's tread depth is too shallow to drive further, the driver can be alerted to this safety issue and can be directed to a nearby tire shop or a tow truck can be ordered.

In still another embodiment, the vehicle's tire pressure sensors and/or the tire pressure monitoring system (TPMS) of the vehicle may be interrogated at the power providing station 400 via a tire interrogator system 420. The tire interrogator system 420 includes tire interrogator 426 that communicate via a wireless connection 428 (as discussed). The tire interrogator 426 may be mounted on rails 422 and may be manually adjustable or automatically adjustable via micro motors installed on the tire interrogator 426. The movement of the micro motors may be controlled by control system 500 so that proper interrogation of the vehicle's tire pressure sensors or TPMS system by the tire interrogator 426 is accomplished. That is some tire pressure sensors may require the tire interrogator 426 to be in close proximately in order to interrogate the tire pressure sensors and thus, adjustments may be needed for variety of vehicles (e.g. sedan, truck).

Upon activation of the tire pressure sensors or the TPMS, the various information of the tires may be received by control system 500 including tire pressure, ID of the tire pressure sensors and on which tires each of the sensors are located in relation to the vehicle, battery or power remaining on the tire sensors and the like. The vehicle information may have been previously provided to the control system 500 or the tire interrogator system 420 may automatically interrogate the tire sensors or TPMS using various different communication means until a return signal is received. For example, ultra-high frequency such as 434 MHz or 315 MHz may be sent to the tire sensors. If manual activation through a magnet is required, then a technician or even the driver may be instructed to place the magnet near each tire sensors for activation of the sensor in order to send the tire information to the control system 500.

In a further embodiment, a partial safety inspection including an emission inspection may also be performed at power providing station 400. Emission inspection includes querying the ECUs of the vehicle for any emissions related issues and any set emissions related DTCs. As noted herein, DTCs and diagnostic information may be transmitted via the connected vehicle 402 through the wireless computer system 406 or via the wireless vehicle diagnostic tool 116. Thus, emissions testing may be conducted at the power providing station 400. The control system 500 receives any set emission related DTC to determine if the vehicle can pass inspection for that particular state in which the power providing station 400 is located. The control system 500 can access its database to help make this determination and send the report to the driver's wireless computing device 150.

Additionally, cameras 430 (or photocells) may properly positioned via mounts (not shown) to determine whether lights on the connected vehicle 402 are working in order to pass the safety inspection. Further, the cameras may also provide proof to state inspection facilities that the lights on the vehicle are working properly or may be displayed to the driver that a light is out. The vehicle's lights may include, turn lamps, headlights, back up lights, brake lights, license plate lights and the like. Although safety inspection may not be fully performed at the power providing station, it may be completed at the power providing station by an inspector (qualified attendant) for the remainder of the safety inspection and thus, saving time for the driver. Additionally, the driver may have an opportunity to fix any issues before paying for a full inspection as often inspection facilities will not provide a partial refund for failed inspections. Instructions to the driver, if needed, to turn on or activate certain lights may be displayed on the display 412 (or voice) on the connected vehicle or on the wireless computing device 150.

Battery tester 117 may also be provided to the driver or placed on the battery by an attendant in order to perform the battery tests (e.g. heavy load) on the battery to determine any issues (e.g. not holding charge, discharging too rapidly) with the battery. The results of the test may be wireless sent to the control system 500 or the driver's wireless computing device 150. At the control system 500, warranty information about the battery or recall information may be retrieved from databases and sent to the driver. Further control system 500 may also receive the battery test information and run additional diagnostic on the data sent by the battery tester 117. The battery information may be previously entered into the control system 500 or the battery bar code is scanned, for example, by the driver's wireless computing device 150 and sent to the control system 500.

FIG. 5 illustrates a control system 500 that may be used with the EVCS 100 or the gas pump 300 according to an embodiment of the invention. The control system may be part of the EVCS or gas pump or may be remote from them, such as a remote server. The control system 500 includes computing device 504 that may communicate, via network 502, with other remote computing devices such as remote databases or the wireless computing device 150. The computing device 504 may include various components in order to perform diagnostics, received diagnostic information, transmit diagnostic information, and control the various functions of the EVCS 100 or the gas pump 300 and the like. Example components include a processor 506, memory 508 having software 509, database 510, global positioning system (GPS) 514, payment system 516, wireless interface 518 and a bus line 512.

The processor 506 may be any type of processors including field programmable gate array, controller, microprocessor, application specific integrated circuit (ASIC) and the like. The processor controls the various functions of the EVCS 100 or the gas pump 300 via software 509 including receiving payments, processing and diagnosing various diagnostic information that is received such as DTCs collected from the wireless vehicle diagnostic tool 116, diagnostic cable, wireless computer system 406, battery information from the wireless battery tester 117, tread depth information from the tire tread determination system 410, tire sensor information from the tire interrogator system 420, cameras 430 and the like and generating and sending results based on the diagnostic information.

Memory 508 includes software 509 to perform the various functions of the EVCS 100 or the gas pump 300 and includes diagnostic software (including various vehicle communication protocols (e.g. CAN)), operating systems (e.g., Apple OS, Windows, Linux) and the like. Database 510 may include all the necessary diagnostic information such as parts needed, top fixes based on retrieved diagnostic information or DTCs, warranty information, service bulletins, recalls, coupons, rebates, specials, locations of service stations, parts stores locations and the like. Based on vehicle diagnostic and retrieved set DTCs, the control system using the top fixes database can diagnose the vehicle including parts and services that may need to be performed and the urgency, if any, for the service to be performed and/or the parts to be replaced. In another embodiment, the control system 500 may communicate with a remote database to retrieve other or similar information.

Wireless interface 518 includes various transceivers, receivers, transmitters, antennas and the like may communicate in various protocols including communication protocols used by various ECUs in the vehicle. For example, RF (radio frequency), satellites, cellular phones (analog or digital), Bluetooth®, Wi-Fi, Infrared, ZigBee, Local Area Network (LAN), WLAN (Wireless Local Area Network), Wide Area Network (WAN), NFC (near field communication), other wireless communication configurations and standards, or a combination thereof may be used by the wireless interface 518.

Payment system 516 can be used to receive the various mobile payment systems and credit/debit card systems including the ones discussed herein. A global positioning system 514 may also be included in the computing device 504 in order to provide directions from the power providing station 400 to the nearest service stations and/or parts stores in order to fix the issues identified by the control system 500. In one embodiment, the report generated by the computing device 504 may include the diagnosis including the services and/or parts that are needed, directions to the various service stations and/or parts stores including any relevant coupons, specials and rebates. A bus line 512 is provided in order for the various components of the control system 500 to communicate with each other.

It should also be noted that the software implementations of the invention as described herein can be stored on a tangible, non-transitory storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. Accordingly, the invention is considered to include a tangible storage medium or distribution medium, as listed herein and including art-recognized equivalents and successor media, in which the software implementations comprising code segments are stored. Additionally, although a diagnostic tool is described herein, the invention may be implemented on any computing device such as a personal computer, notebook, smart phone, a tablet and the like.

The many features and advantages of the invention are apparent from the detailed specification, and thus, it is intended by the appended claims to cover all such features and advantages of the invention, which fall within the true spirit, and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A station for providing electric power to a vehicle, comprising:
    an electric power providing station that provides electric power to the vehicle via a connector, the electric power providing station configured to magnetically lock a wireless diagnostic tool or a wireless battery tester in place until released and includes a mobile payment sensor, wherein when the magnetic lock is released, a locked screen is also unlocked on the wireless diagnostic tool or the wireless battery tester;
    a diagnostic bay configured to perform various diagnostic functions including tire depth measurement and retrieving a set diagnostic trouble code from a vehicle's electronic control unit; and
    a control system configured to receive a payment for the various diagnostic functions and power, the control system further configured to receive the tire depth measurement and the set diagnostic trouble code, wherein the control system diagnoses the vehicle based on the received tire depth measurement and the set diagnostic trouble code, and wherein the diagnosis is sent to a driver's wireless computing device.

2. The station of claim 1, wherein the wireless diagnostic tool or the wireless battery tester is released from the electric power providing station upon the payment being received for the power.

3. The station of claim 2, wherein a second payment is made if the wireless diagnostic tool or the wireless battery tester is not returned to the electric power providing station after a predetermined period of time.

4. The station of claim 1, wherein the wireless battery tester is configured to conduct a battery test on a vehicle's battery and sends the results to the driver's wireless computing device or the control system.

5. The station of claim 1, wherein the electric power providing station is an electric vehicle charging station.

6. The station of claim 1, wherein the wireless diagnostic tool retrieves vehicle diagnostic information including the set diagnostic trouble code from the vehicle and transmit the diagnostic information to the control system.

7. The station of claim 1, wherein instructions to a driver to turn on a light of the vehicle as part of a partial safety inspection is displayed on a display of the driver's wireless computing device or the vehicle.

8. The station of claim 1, wherein the diagnostic functions include an emission inspection or a partial safety inspection.

9. The station of claim 8, wherein the emission inspection includes retrieving a set emissions related diagnostic trouble code.

10. The station of claim 1, wherein the connector is an electrical connector.

11. The station of claim 1, wherein the diagnostic functions also include interrogation of a tire sensor on the vehicle via a tire interrogation system.

12. An electric charging station for providing electric power to a vehicle, comprising:
   a connector configured to be received in the vehicle's charging receptacle to provide electric power;
   a mobile payment sensor configured to receive a payment via a wireless computing device; a wireless diagnostic tool configured to be magnetically locked in place with the electric charging station until released, wherein when the wireless diagnostic tool is released, a locked screen is also unlocked on the wireless diagnostic tool;
   a diagnostic bay configured to perform various diagnostic functions including tire depth measurement and retrieving any set diagnostic trouble code from a vehicle's electronic control unit; and
   a control system configured to receive the payment sensed by the mobile payment sensor for the various diagnostic functions and electric power, the control system further configured to receive the tire depth measurement and the set diagnostic trouble code, wherein the control system diagnoses the vehicle based on the received tire depth measurement and the set diagnostic trouble code, and wherein the diagnosis is sent to the wireless computing device.

13. The station of claim 12 further comprising a wireless battery tester that is magnetically locked in place with the electric charging station, the wireless battery tester conducts a battery test on a vehicle's battery and sends the results to the wireless computing device or the control system.

14. The station of claim 13, wherein the wireless diagnostic tool or the wireless battery tester is released from the electric charging station upon the payment being received for the electric power.

15. The station of claim 13, wherein a second payment is made if the wireless diagnostic tool or the wireless battery tester is not returned to the electric charging station after a predetermined period of time.

16. The station of claim 12, wherein the wireless diagnostic tool retrieves vehicle diagnostic information including the set diagnostic trouble code from the vehicle and transmit the diagnostic information to the control system.

17. The station of claim 12, wherein the diagnostic functions include an emission inspection or a partial safety inspection.

18. The station of claim 17, wherein instructions to a driver to turn on a light of the vehicle as part of the partial safety inspection is displayed on a display of wireless computing device or the vehicle.

19. The station of claim 12, wherein the diagnostic functions also include interrogation of a tire sensor on the vehicle via a tire interrogation system.

20. The station of claim 12, wherein a contact information for the wireless computing device is provided when a mobile pay system on the wireless device is used to pay for the electric power.

* * * * *